June 3, 1930. H. D. GEYER 1,761,525
STEERING WHEEL
Filed April 3, 1928

Patented June 3, 1930

1,761,525

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed April 3, 1928. Serial No. 266,939.

This invention relates to handwheels, especially such as are adapted for use as steering wheels on automotive vehicles and the like.

An object of this invention is to provide an efficient handwheel of improved appearance and economical to manufacture.

A more specific object is to provide elastic rubber handgrips encasing the spider arms and at the same time serving to conceal the means for fixing the arm ends to the rim and providing a neat joint between the arm and rim.

Another object is to provide a simple and economical method of assembly of the rim, spider, and handgrips, utilizing the elasticity of the handgrips to permit them to be first slipped inwardly over the arms beyond their final position to enable the arm ends to be attached to the rim, and then to be slipped outwardly to their final position.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the drawings.

The annular rim 10 may be formed according to any well known method, for instance, of wood segments or of molded composition, and has been illustrated as formed of wood.

Figure 1:
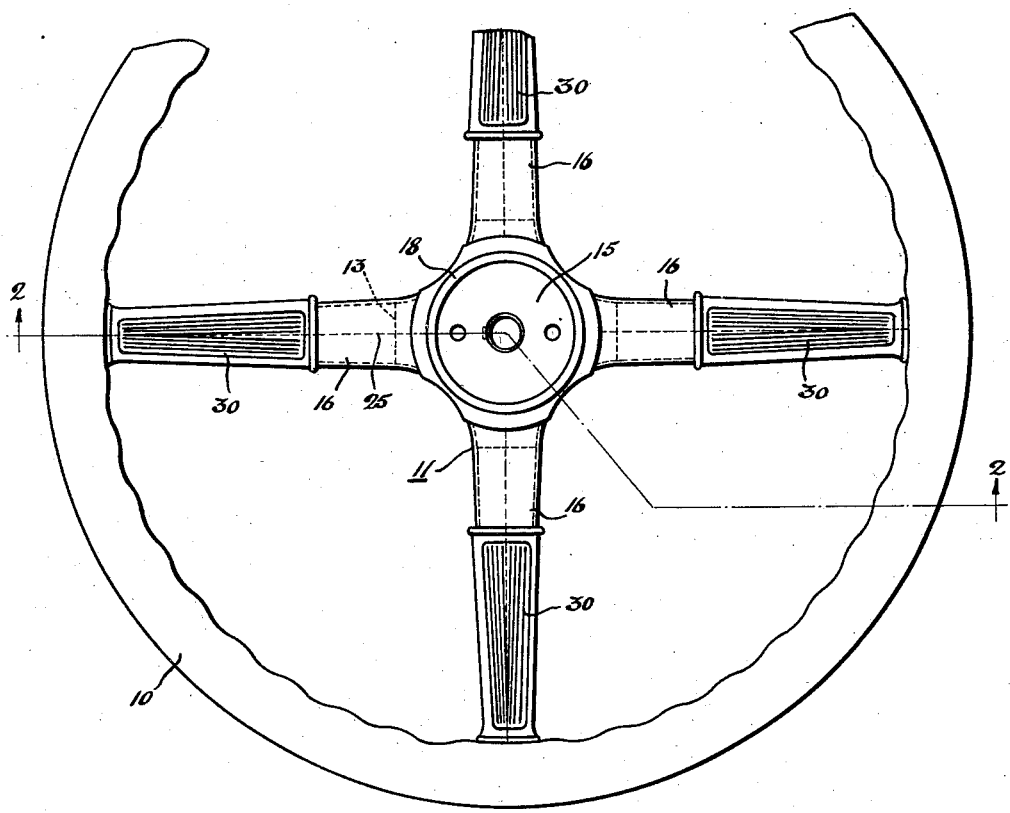
Fig. 1 is a plan view of an automobile steering wheel built according to this invention.
Figure 2:
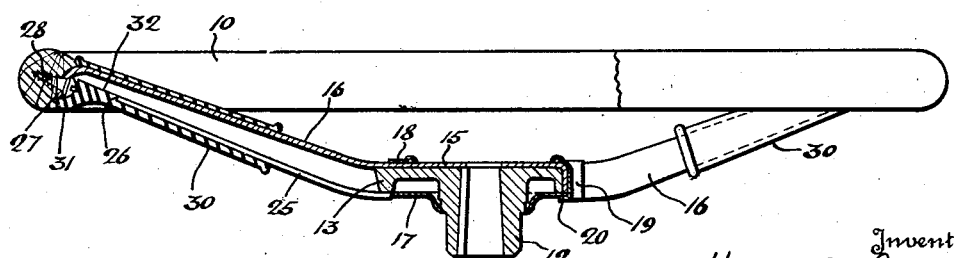
Fig. 2 is a vertical section taken on the line 2—2 of Fig. 1.

The central spider, designated in its entirety by numeral 11, has a central hub casting 12 with four radially extending integral projections 13 thereon. The spider arms are formed from a one-piece sheet steel stamping 15 which overlies the top surface of hub 12 and is held rigidly fixed thereto by the four box section arms 16 being formed about the four projections 13 of the hub 12, as shown in Fig. 2.

For purposes of adornment, a bottom cover plate 17 of somewhat cup-shape is provided and also a top cover plate 18 which has outwardly concave depending projections 19 extending down between the arms 16 and flanged over at 20 to fix the top and bottom cover plates rigidly in place. Preferably the top and bottom cover plates 18 and 17 are formed from a bright metal such as aluminum alloy and so give the general appearance of a cast metal hub having radial recesses into which the arms 16 are inserted.

The integral box-section arms 16 are formed by being folded around the projections 13 of the hub by a die press and have therefore a longitudinal abutting seam 25 on the under side of each spoke. At the outer ends of the arms 16 the bottom wall of the box-section is cut away forming an opening 26, and the top wall of the box-section is bent downwardly forming a relatively short end flange 27 which fits snugly within a corresponding recess in the rim 10 and is held rigidly fixed thereto by the screw 28. The opening 26 provides sufficient clearance to enable the proper insertion of the screw 28 by a screw driver. It will be noted that by this construction the screws 28 can be driven into the rim 10 in substantially the direction of the arms 16, thereby giving the spider arms 16 of the general improved appearance of ordinary inserted arms rather than arms screwed to the under side of the rim.

The molded soft rubber boots or handgrips 30 are provided to encase the outer portions of each arm 16 to give a convenient and more comfortable grip for the hands of the automobile driver and at the same time to greatly improve the appearance of the wheel. These grips or boots 30 are of such size as to snugly engage the box-section metal arms and form a neat fit thereon. The outer ends of the boots 30 are molded to such shape as to fit snugly up against the rim 30 and completely conceal the outer ends of the metal arms 16 and the joint between the rim and arms. For this purpose boot 30 is provided on its lower outer end with a slightly thickened projecting lip 31 which fits over and conceals the metal flanged end 27 and the screw 28, and provides an outer contour to the arm end which gives the appearance of an inserted arm end rather than a screwed on type. Boot 30 also preferably has a slightly thickened portion or lug 32 which fits within the opening 26 in the lower wall of the box-section arm and aids in retaining the boot 30 in its proper place during use.

The elasticity of the boots 30 is taken advantage of in the method of assembly of the rim, spider and boots. Before assembling the spider and rim, a boot 30 is telescoped over each arm 16 to such a distance as to leave the arm ends uncovered to a point say slightly inwardly beyond the opening 26. The spider is then set in place so that the outer ends 27 of the arms fall within the corresponding recesses in rim 10, and the screws 28 are driven home with a screw-driver. The elastic rubber boots 30 are then slipped outwardly to their final position in contact with the rim 10 with the lip 31 and lug 32 thereon fitting snugly into the positions clearly shown in Fig. 2.

If at any time the boots 30 need replacement, it will be a simple matter to slip them back toward the hub and remove the screws 28, after which new boots 30 may be assembled upon the wheel in the manner above described.

While the form of embodiment of the present invention as herein disclosed, constitutes a preferred form, it is to be understood that other forms might be adopted, all coming within the scope of the claims which follow.

What is claimed is as follows:

1. A handwheel comprising: an annular rim, and a central spider therefor having the outer ends of the arms turned downwardly and fixed to the rim by headed screws, a separately molded soft rubber boot encasing the outer portion of an arm and having a lip on the under side thereof contacting with said rim and concealing the screw.

2. A handwheel comprising: a rim, and a central spider therefor having box section metal arms, the outer ends of said arms having one metal wall of the box section bent over to form an end surface for abutment against said rim, screws for fixing said bent over ends to said rim, and separately molded soft rubber boots encasing the outer portions of said arms, said boots each having an integral lip snugly fitting over and concealing said bent over end and screw.

3. The steps in the method of making a handwheel comprising: providing a separate annular rim and central spider therefor having a plurality of arms, telescoping a flexible boot over the outer end of each to such distance as to leave the arm ends uncovered, attaching the spider to the rim by fixing the end of each arm to the rim, and then slipping the flexible boots outwardly on the arms to contact with the rim and conceal the arm ends.

In testimony whereof I hereto affix my signature.

HARVEY D. GEYER.